FIG. 1 THREE-VARIABLE LOGIC CHART AND CONSTRUCTION OF THE FUNCTION (Ā · B) v C

INVENTORS
FRANKLIN R. DEAN
ROBERT W. BROOKS
by
EZEKIEL WOLF
THEIR ATTORNEY

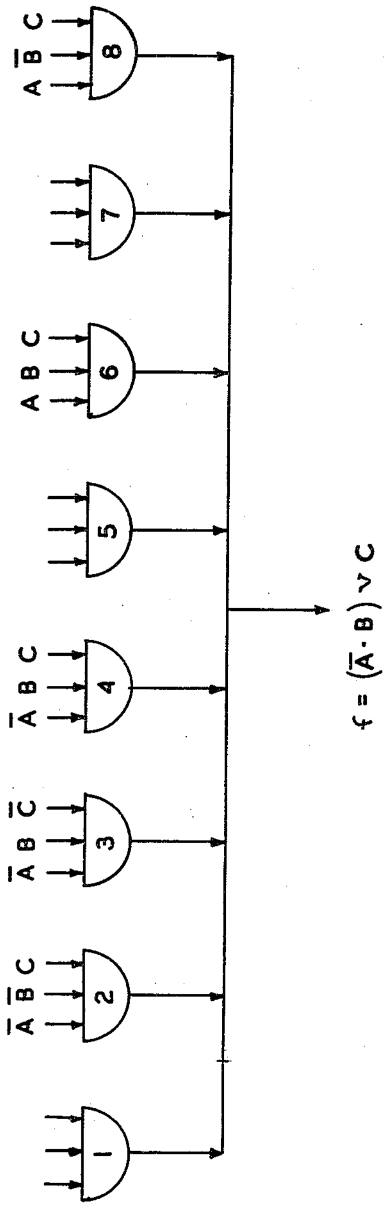
FIG. 2 USE OF 8 GATES AND BUFFER FOR 3-VARIABLE FUNCTION.
INVENTORS
FRANKLIN R. DEAN
ROBERT W. BROOKS
by EZEKIEL WOLF
THEIR ATTORNEY

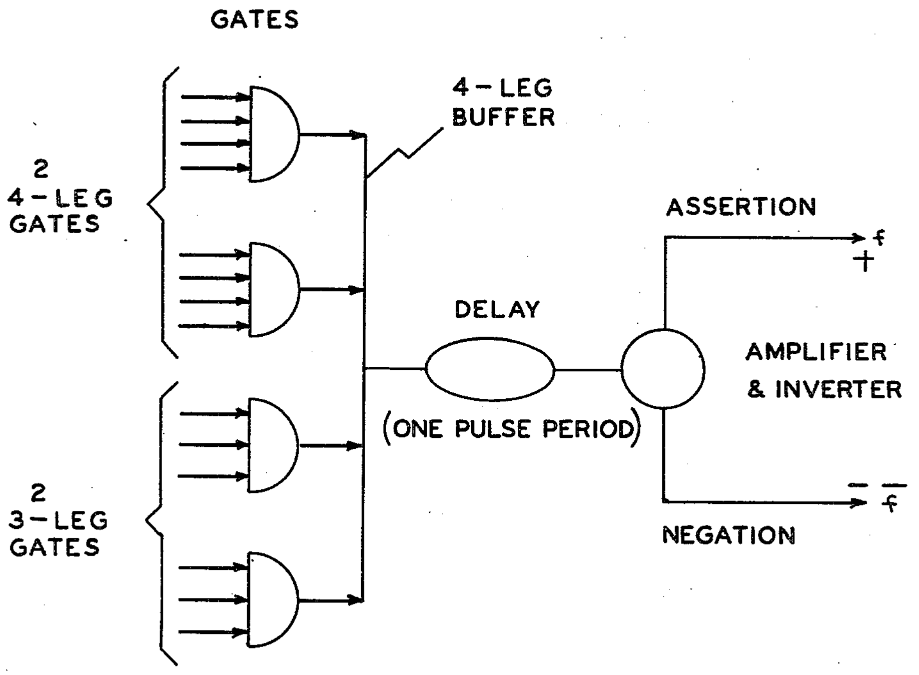
FIG. 3 3C-PAC, A SIMPLE AND VERSATILE GATING PACKAGE
INVENTORS
FRANKLIN R. DEAN
ROBERT W. BROOKS
by EZEKIEL WOLF
THEIR ATTORNEY Jan. 21, 1958 F. R. DEAN ET AL 2,820,897
UNIVERSAL GATING PACKAGE
Filed Aug. 29, 1955 6 Sheets-Sheet 4
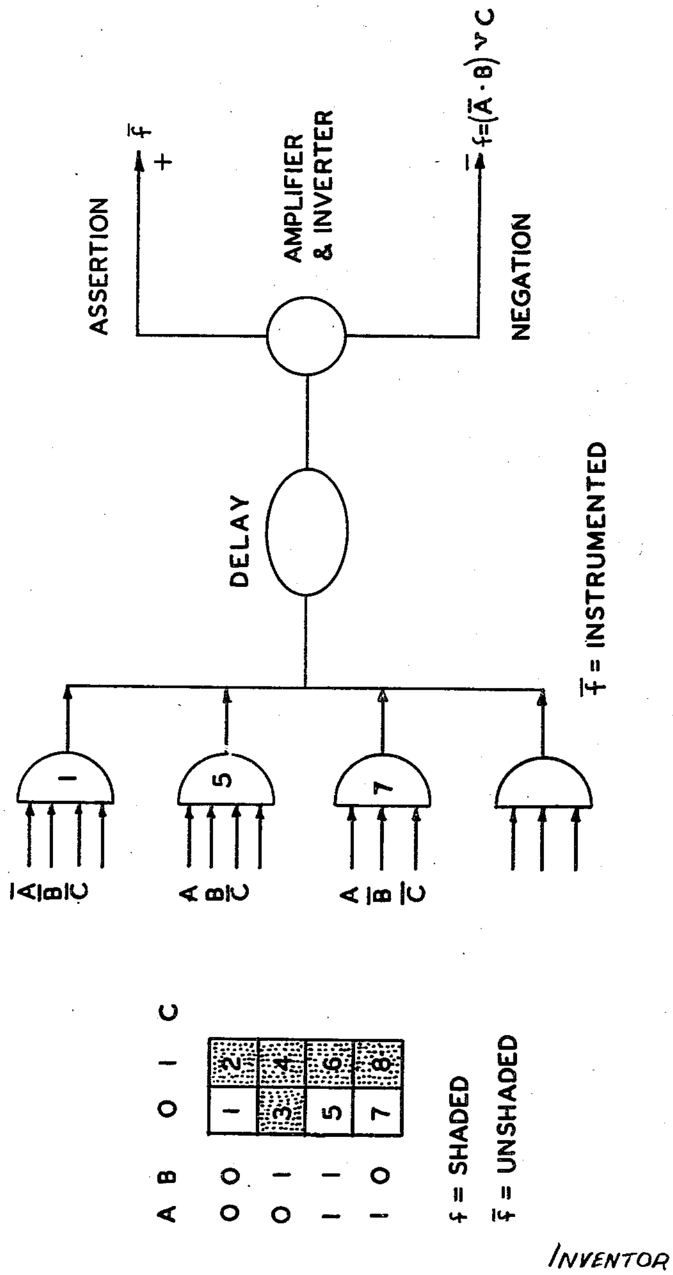
FIG. 4. REPRESENTATION OF 3-VARIABLE FUNCTION WITH 3C-PAC.
INVENTORS
FRANKLIN R. DEAN
ROBERT W. BROOKS
by
EZEKIEL WOLF
THEIR ATTORNEY.

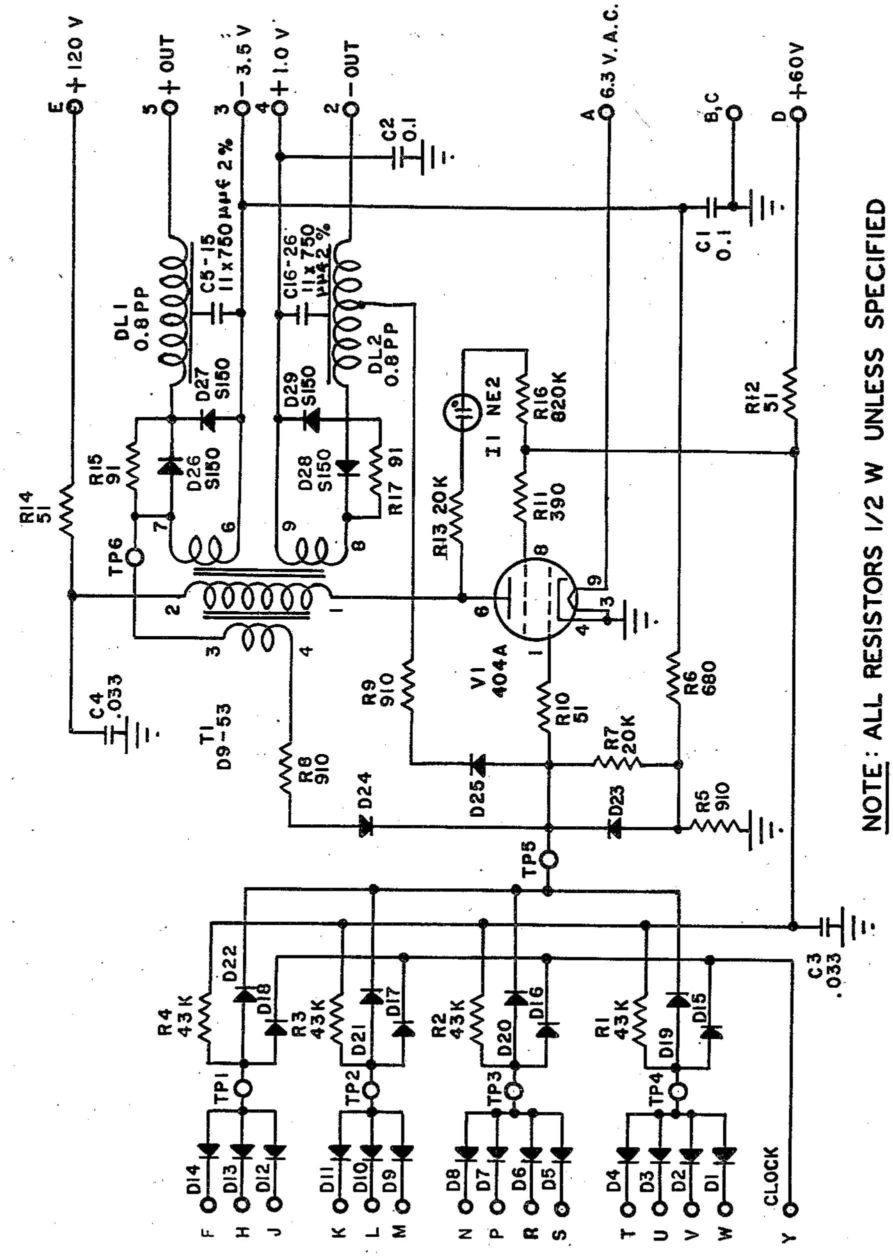
NOTE: ALL RESISTORS 1/2 W UNLESS SPECIFIED
ALL CAPACITORS IN μf UNLESS SPECIFIED
ALL DIODES CK705A UNLESS SPECIFIED
FIG.5 GP-1 SCHEMATIC
INVENTORS.
FRANKLIN R. DEAN
ROBERT W. BROOKS
by EZEKIEL WOLF
THEIR ATTORNEY.

UNIVERSAL GATING PACKAGE
Filed Aug. 29, 1955 6 Sheets-Sheet 6
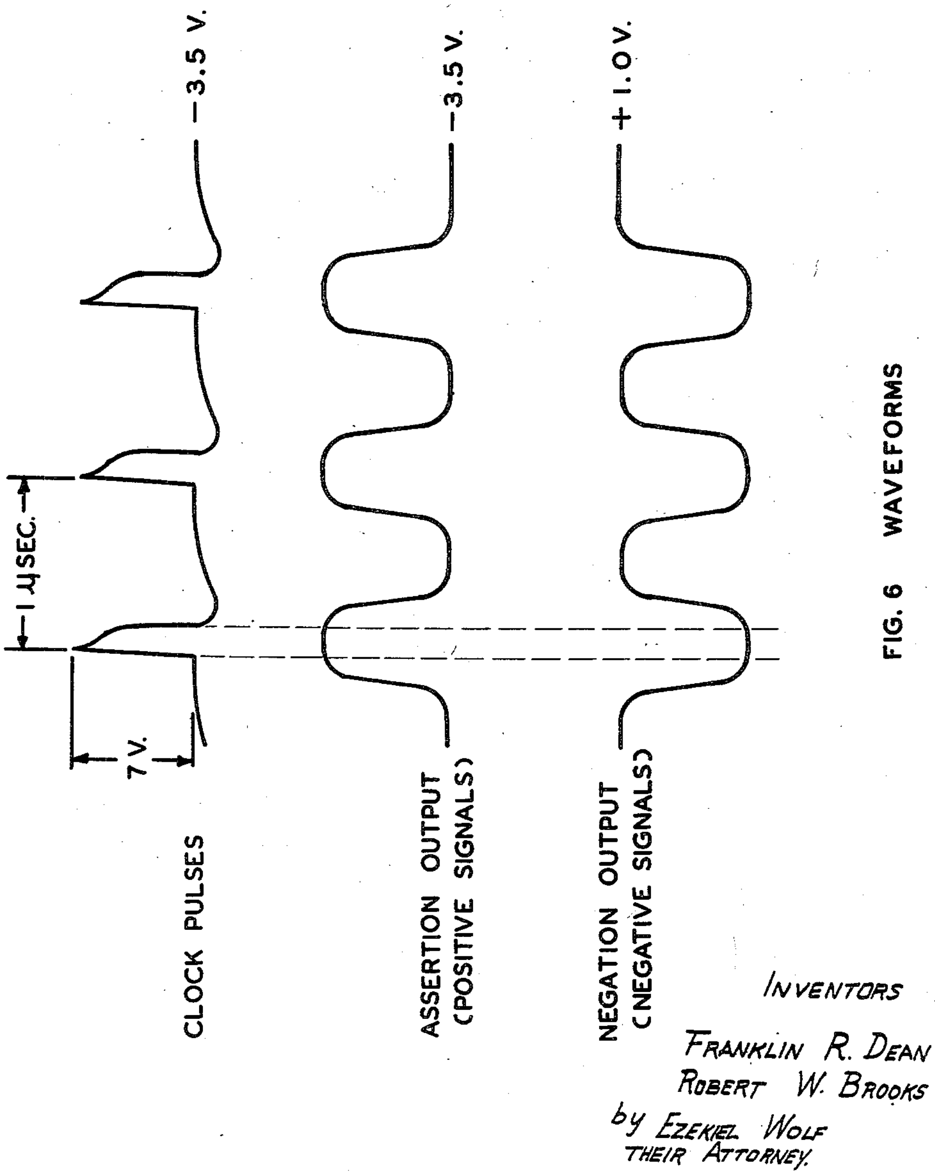
FIG. 6 WAVEFORMS
INVENTORS
FRANKLIN R. DEAN
ROBERT W. BROOKS
by EZEKIEL WOLF
THEIR ATTORNEY.

United States Patent Office 2,820,897

Patented Jan. 21, 1958

2,820,897

UNIVERSAL GATING PACKAGE

Franklin R. Dean and Robert W. Brooks, Needham, Mass., assignors to Computer Control Company, Inc., Wellesley, Mass., a corporation of Massachusetts

Application August 29, 1955, Serial No. 531,068

5 Claims. (Cl. 250—27)

The present invention relates to a computer device and more particularly to a unit of such a device, a plurality of which form an essential part of the computer structure of the present invention. Such a unit may be designated "A computer building block," "A universal gating package," "A logical dynamic decisions device," "A logical decisions package," or simply "A logical package."

It forms the basic computer element or package from which a large electronic computer may be built up. The basic package of the present invention may be a package having the ability to produce all functions of three variables by the use of a gating structure which results in synchronized output signals used to operate other identical packages.

The present invention further contemplates the use of a package having four three-legged gates and buffers for handling three variables as well as a pacakge of two four-legged gates and two three-legged gates which is able to handle all functions of three variables as well as 51,358 functions of four variables and many functions of five to fourteen variables.

The merits, purposes, advantages, and the basic principles of the present invention will be more fully understood from the description in the specification set forth below when taken in connection with the diagrams, charts and drawings forming a part of the invention in which:

Figure 2 shows the use of 8 gates and buffers for the 3-variable function built up in Figure 1;

Figure 3 shows a gating package built up of two four-legged gates and two three-legged gates with a four-leg buffer and other elements used in the package;

Figure 4 shows how a gating package may be made to function using the negation of the signals or pulses by means of an amplifier and inverter;

Figure 5 shows schematically an actual circuit for the package shown in Figures 3 and 4; and Figure 6 shows the kind of pulse signal which may be used for the clock pulse, the positive signals, assertion outputs and negative signals, negation outputs.

Figures 1A, 1B, 1C, 1D, 1E, 1F:
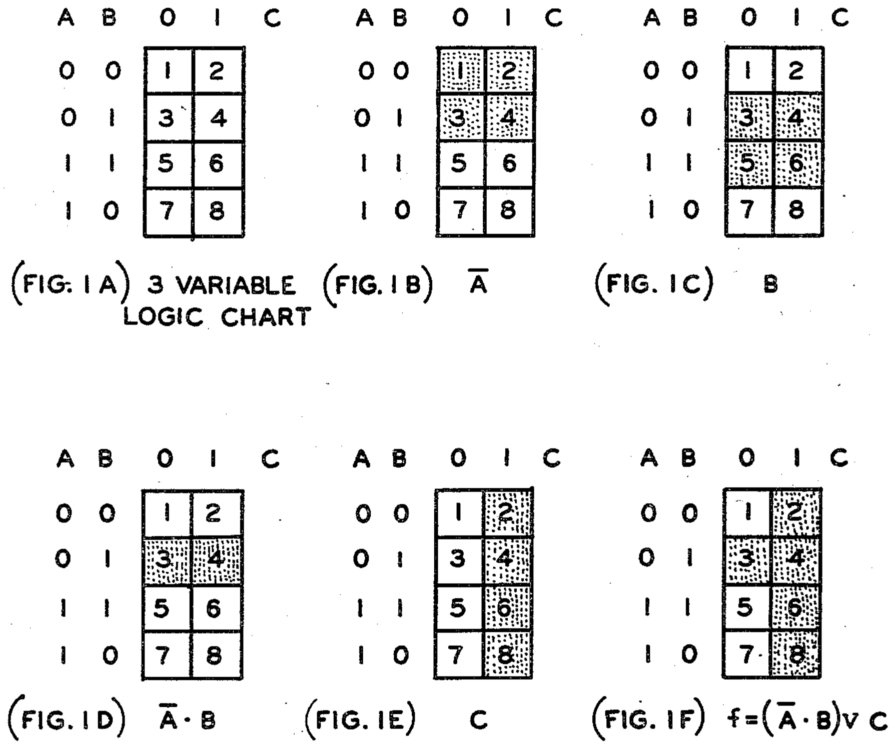
Figure 1 (*a, b, c, d, e,* and *f*) shows a logic chart for all combinations of three variables A B C with the building up of the function $(\bar{A}\cdot B)vC$.

Figure 1, *a* to *f* inclusive, shows a logic chart of three variables in which there are $2^{2^3}$ or $2^8=256$ combinations. Figure 1 illustrates the building up of a simple function of the three variables selected at random for illustration, namely $(\bar{A}\cdot B)vC$.

In the present system there are only two conditions to be considered for each variable. If the variable is true, it is represented by 1; if false, it is represented by 0's. In the nomenclature to follow, the negation of the variable is represented by a line over the variable, as $\bar{A}$, so that if A is true, $\bar{A}$ is false; and if $\bar{A}$ is true, A is false. Where both A and B are true $(A\cdot B)$ as written is true. Where either A or B is true $(AvB)$ as written is true. Similarly, where $(\bar{A}\cdot\bar{B})$ are true, both A and B must be false; and where $(\bar{A}v\bar{B})$ is true, either A or B must be false.

Upon the basis of Figure 1, the chart for the building of the function $f=(\bar{A}\cdot B)vC$ will combine the results shown in 1 *b, c, d* and *e*. The chart *b* shows the shaded squares which are true when $\bar{A}$ is true which occurs when A is false; the chart *c* shows the shaded squares which are true when B is true; the chart *d* shows the shaded squares which are true when both $(\bar{A}\cdot B)$ are true; and the chart *e* shows the shaded squares which are true when C is true. The conditions fulfilling the $(\bar{A}\cdot B)$ conditions is shown on chart *d* and that fulfilling $(\bar{A}\cdot B)vC$ conditions is shown in chart *f*. The condition fulfilling $f=(\bar{A}\cdot B)vC$ conditions is the summations of the five squares involving 2, 3, 4, 6 and 8 of Figure 1*f* as follows:

$$f=(\bar{A}\cdot\bar{B}\cdot C\cdot)\ v\ (\bar{A}\cdot B\cdot\bar{C}\cdot)\ v\ (\bar{A}\cdot B\cdot C\cdot)\ v\ (A\cdot B\cdot C\cdot)\ v\ (A\cdot\bar{B}\cdot C\cdot)$$

The eight-gate structure of Figure 2 is shown set up to represent the truth of the statement $f=(\bar{A}\cdot B)vC$ of Figure 2. The false of the statement can be represented by merely implementing the unshaded squares of the chart of Figure 1.

In Figure 3 is shown a simplified package which can perform all of the functions of the three variable eight gate package of Figure 2. As has been stated above, this package further handles many functions of four and more variables. The four gate package of Figure 3 can replace the eight gate package of Figure 2 because of the use of the inverter at the outputs of the package.

The output inverter permits either the truth or the false of the output to be selected as desired. If the number of shaded squares of Figure 1 were four or less, the truth of the output would be selected for implementation; while if they were more than four, the false of the output would be selected for implementation. It is possible to accommodate, therefore, all the selections of three variable functions by only four gates.

In Figure 3 the composition of the package is made up of two four-legged gates and two three-legged gates, each gate working through the same four leg buffer through a delay line of one pulse period to an amplifier and inverter from which either the assertion or the negation may be selected. For the function $f=(\bar{A}\cdot B)vC$, if the three unshielded squares are selected the squares 1, 5 and 7 of Figure 1*a* will provide through the inverter the same results from the device of Figure 3 that the five gates and buffer for the three variables which is supplied from Figure 2.

The general rules for implementing any function of three variables with the package of Figure 3 may be set down as follows:

(1) Shade in the squares of the three-variable chart that represent the truth of the defined function *f*.

(2) If the number of shaded squares is four or less, implement function *f* by making the connections that correspond to the shaded squares. The positive output lead indicates the truth *f* of the function represented; the negative output lead represents the false *f*.

(3) If the number of shaded squares is greater than four, implement the function *f* by making the connections that correspond to the unshaded squares (i. e., implement the false *f* of the function). The negative output lead represents the truth *f* of the described function; the positive output lead represents the false *f* of the function.

Figure 4 shows how the function $f=(\bar{A}\cdot B)vC$ is implemented in accordance with the unshaded squares of Figure 1*f*. Square 1 of Figure 4 represents by $\bar{A}\cdot\bar{B}\cdot\bar{C}$; square No. 5 represents by $(A\cdot B\cdot\bar{C})$ and square No. 7 represents $(A \cdot \bar{B} \cdot \bar{C})$. The negation of this function, $(\bar{A} \cdot \bar{B} \cdot \bar{C})$ $v$ $(A \cdot B \cdot \bar{C})$ $v$ $(A \cdot \bar{B} \cdot \bar{C})$, equals the function $f = (\bar{A} \cdot B) v C$.

In operation, synchronized pulse trains enter gate legs 1, 5 and 7 and pass through the gates and buffer to provide a resultant output pulse train. One such pulse operation is performed each microsecond because of the delay which furnishes a one microsecond pulse delay period. The result of this operation is carried over for use during the next pulse period. The one pulse period delay is used, therefore, to perform this carry-over function and aids in the synchronization of pulse signals. It may be desirable to hold the output pulse train for greater than a single pulse period and if so, a greater pulse delay period could be used.

In the drawing in Figure 5, there are two three-legged gates with inputs F, H, J, K, L, M, respectively connected to diodes D14, D13, D12, and D11, D10 and D9 respectively and two four-legged gates with inputs N, P, R, S and T, U, V and W connected to diodes D8, D7, D6, D5, D4, D3, D2, and D1 respectively. In normal operation, these gate inputs F to W are connected directly to the outputs of other gating packages and receive from them the positive or negative signals for operation. All of the gate circuits are identical in construction.

Before further describing the arrangement shown in Figure 5, it may be desirable to establish some definitions which will be used in the description of this figure:

(1) All signals are defined by voltage level as follows: The false signal zero is defined as having a voltage level of below −2 volts; the true signal one is defined as having a voltage level of above 0 volts.

(2) Assertion output (+ out) is referred to −3½ volts through 91 ohms terminating resistor in the output, normally zero which may be pulsed positive to an assertion one.

(3) Negation output (− out) referred to +1.0 volt through 91 ohms terminating resistor in output, normally one pulsed negative to zero.

(4) The conventional diode is shown in Figure 5 for D1 to D14 as an example in which the arrow points in the direction of positive current flow anode to cathode thus →|.

(5) A gate structure is defined as a diode structure connected so that all inputs must be one for the output to be one. A zero on any input leg will cause zero output of the gate.

(6) *Buffer.*—This is a diode structure connected so that a one or assertion on any input will cause an assertion of one on the output.

(7) *Pulse period.*—This is a time between two adjacent clock pulses which will be discussed later.

The legs of each gate on the input in Figure 5 are connected in parallel. As long as any input gives a signal represented by zero which, of course, is the false signal, the gate will be zero and the diode associated with the zero signal will prevent the gate from rising above −3.5 volts and, therefore, no signal will be passed through the gate. If all the inputs to the gate are floating (not conducted) or are raised to the one condition as opposed to the zero condition, namely, having a potential of above 0 volts, the output is raised via the leg rsistors R1, R2, R3, and R4 and a one signal is obtained. The output circuit of the diodes D1 to D14, namely the connections to the anodes, TP1, TP2, TP3 and TP4, are connected to the anodes of the buffers D19, D20, D21 and D22 respectively.

There are also connected to these anodes resistors R1, R2, R3 and R4 respectively, which are connected in parallel to a sixty volts source and by-passed to ground by a small capacitor C3. The reshape diodes D15, D16, D17 and D18 prevent a one signal from occurring until a positive clock pulse occurs at the clock input, which is indicated at Y in Figure 5. Should any of the four gates produce a one signal, that is a voltage above 0 volts, the appropriate buffer diode D19 to D22, will conduct and cause the grid 1 of the amplifier tube V1 to go positive according to the voltage at TP5 from the positive signal out of the buffer circuit. At the input of the amplifier circuit, there is a resistance divider network comprising the resistances R5 and R6 which is designed to make the anode potential of the diode D23 which may be called the clamp diode normally about −2 volts. Under no signal condition this diode D23 conducts and holds the amplifier input potential to a −2 volts. All signals through the gate and buffer input must rise to at least −2 volts before the amplifier grid starts to rise. In this manner, all noise of less than 1.5 volts amplitude is clipped before reaching the amplifier. As the amplifier goes into conduction by a signal of greater than −2 volts, the anode in the amplifier, namely, the plate 6 is driven negative and through transformer action positive feedback is applied by the diode D24 and limiting resistor R8 to the grid 1. Amplification is greater than unity so that regeneration takes place and is limited only by "plate bottoming" and at this point regeneration has completely taken over control from the gate buffer input. The negative pulse output from transformer T1 at terminals 8 and 9 on the secondary is delayed approximately one-half a pulse period and is fed back to the amplifier input via the diode 25 and limiting resistor R9 and, thereby, the input pulse is stopped. As a result of these actions, the amplifier output pulse is standardized in time, amplitude and width by the clock pulse reshaping, amplifier saturation limiting and delayed negative feed-back, respectively. Two secondary output windings are used, the assertion winding providing the positive signals are given across terminals 6 and 7, which are referred to a −3.5 volt and yields a positive pulse. The negative windings terminals 8 and 9 is referred to a 1.0 volt and yields a negative pulse. A pair of diodes mainly D26 and D27 in the output of the terminals 6 and 7 and D28 and D29 in the output of the terminals 8 and 9 serve in the following fashion. During pulse time, both diodes D26 and D28 are conducting. Diodes D27 and D29 are, however, open providing an open circuit and the transformer is loaded by delay lines DL1 and DL2. Delayed signals are available, therefore, at the output across the terminals 3, 5 and 2, 4.

Energy stored in the transformer during the pulse application must be released between adjacent pulsings. This energy release is observed as a pulse overshoot in the transformer. This overshoot is kept from the output and rapidly disappears because first diodes D27 and D29 becomes short-circuited across the outputs and secondly, because resistors R15 and R17 are of proper value to critically damp the transformer and allow almost complete recovery before the next pulse is amplified.

As a general description of the amplifier circuit and its associated elements, it will be noted first that the tube A is normally biased near cut-off. When a gate is activated, the grid 1 of the tube is driven more positive and the tube amplifies a signal. The positive feedback increases the gain of the amplifier and continues to drive the control grid even after the gate signal is no longer present. The electromagnetic delay lines DL1 and DL2 are connected to the positive and negative signals of the output of the transformers 6, 7, 8 and 9 respectively and are of proper length (electrical delay) so that the logical package has exactly one microsecond delay from signal input of the gating structure to the signal output of the delay line. From a point approximately at the middle of the negative signal delay line DL2, the signal is fed back to the control grid via a limiting resistor R9 and an isolation diode D25. This negative feed-back is used to control the width of the amplified signal by restoring the grid to its normal bias voltage and thus stopping the regenerated action of the positive feed-back to the grid.

Figure 6 shows in A, B and C the various types of signals which are used for the different impulses. A indicates the clock pulse which is applied over the line Y in Figure 5. This shows a rise of approximately 7 volts at the beginning of the one microsecond long period. The positive assertion signal indicated the pulse also of the same height which commences a little ahead of the clock pulse and which has already risen to approximately maximum signal when the clock pulse begins. The negative signal or negative output signal is just the opposite of the positive pulse and rises to a negative —7 volt signal before the clock pulse has begun to function.

Having now described my invention, I claim:

1. A universal logical package having input and output terminals and adapted for interconnection and association with a plurality of identical packages for the implementation of logical operations comprising, an electronic circuit including a plurality of And gates and an Or gate, each of said And gates having a predetermined number of inputs coupled to respective ones of said input terminals for external excitation by binary data input signals and each having one additional input joined to a common one of said input terminals for external excitation by a synchronizing clock signal, means for applying the outputs of said And gates as inputs to said Or gate, an amplifier having an input responsive to the output of said Or gate and an output circuit for simultaneously energizing first and second like delay lines in opposite polarity and for simultaneously providing a regenerative feedback signal to said amplifier input, means coupling a tap on one of said delay lines to said amplifier input to furnish a negative feedback signal for controlling the time duration of signals transferred by said amplifier, and means coupling the outputs of said delay lines to said output terminals of said logical package.

2. Apparatus as in claim 1 wherein the delay period of said delay lines is substantially equal to the period between clock pulses applied to said common one of said input terminals.

3. Apparatus as in claim 2 wherein said plurality of diode And gates is comprised of two And gate circuits each having four similarly poled parallel diode legs and two And gate circuits each having three similarly poled parallel diode legs, each of said four And gates having an additional similarly poled parallel diode leg responsive to said externally applied clock signal applied to said common one of said input terminals.

4. Apparatus as in claim 3 wherein said delay line tap provides said output negative feedback signal at a time substantially one half clock period subsequent to the excitation of the input of the respective delay line.

5. Apparatus as in claim 4 and having terminals for the application of opposite polarity bias signals to the outputs of said delay lines.

References Cited in the file of this patent

UNITED STATES PATENTS

| | | |
|---|---|---|
| 2,673,293 | Eckert et al. | Mar. 23, 1954 |
| 2,674,727 | Spielberg | Apr. 6, 1954 |
| 2,712,065 | Elbourn et al. | June 28, 1955 |

OTHER REFERENCES

Proc. of the IRE, val. 41, No. 10, October 1953, pp. 1308, 1309.